3,409,390
TREATMENT OF COMBUSTIBLE
WASTE PRODUCTS
James Hoekstra, Evergreen Park, Ill., assignor to Universal Oil Products Company, Des Plaines, Ill., a corporation of Delaware
Filed Apr. 1, 1963, Ser. No. 269,328
7 Claims. (Cl. 23—2)

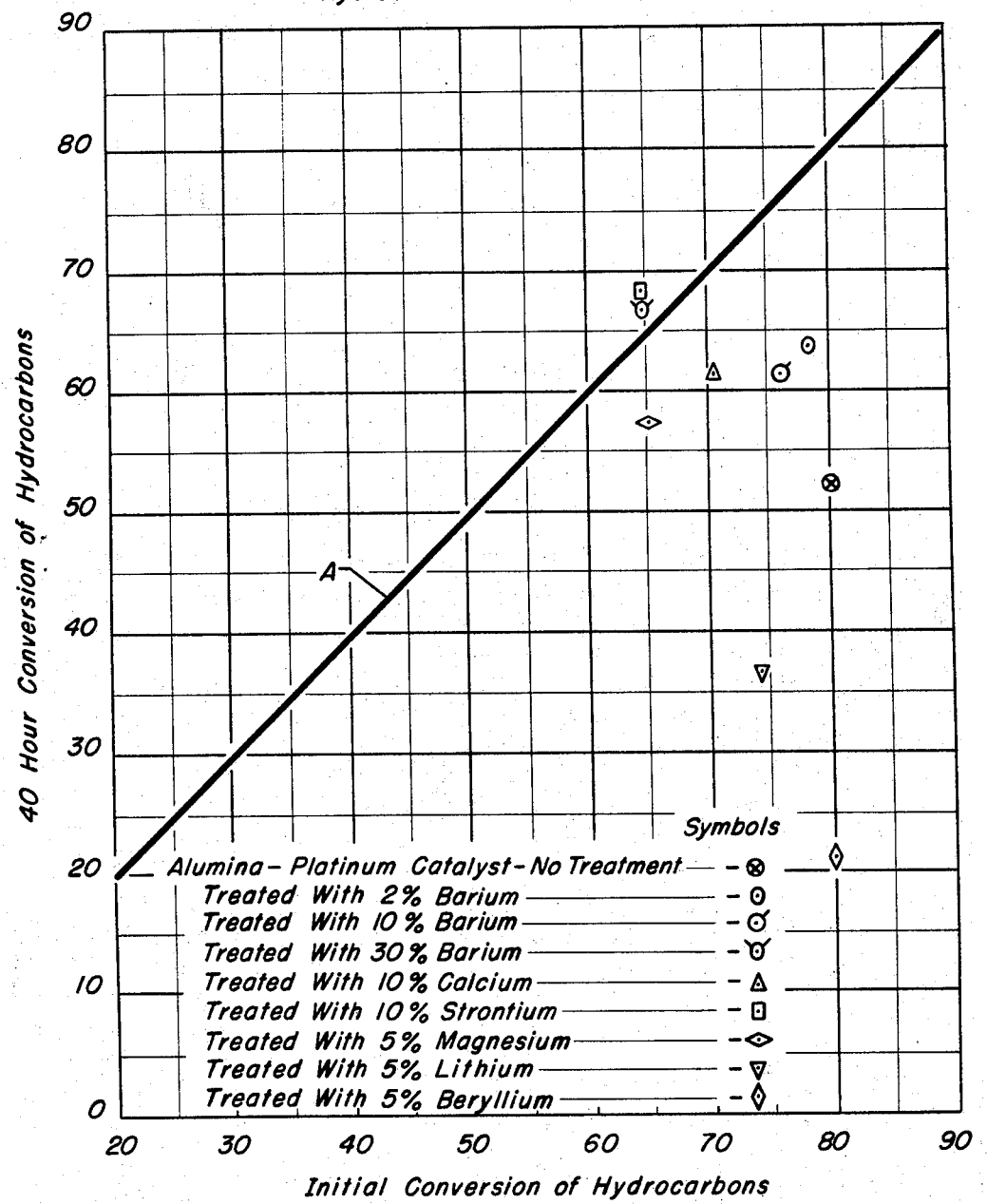

The present invention relates to the treatment of a combustible waste product stream prior to discharging such stream into the atmosphere, and particularly to the use of an improved catalytic composite having a longer life and enhanced stability as well as resistance to lead absorption and lead poisoning when effecting the conversion of auto exhaust gases or other lead containing combustible waste products of a noxious nature.

While the use of a catalytic composite encompassed by the present invention is especially adaptable to the elimination of the products of incomplete combustion from the hydrocarbonaceous exhaust gases emanating from an internal combustion engine, prior to effecting the discharge of such hydrocarbonaceous exhaust gases into the atmosphere, there are also other obnoxious products which may well be treated. For example, unsaturated hydrocarbons, alcohols, ketones, aldehydes, acids, etc., as well as carbon monoxide and oxides of nitrogen and sulfur, etc., comprise objectionable materials.

The desirability and importance of effecting the removal of noxious components from automotive exhaust gases, or the conversion thereof into innocuous components, is now well recognized. At least one state, California, has passed legislation recognizing the inherent danger to the public health and welfare as such noxious gaseous material continues to be discharged into the atmosphere, and, in this regard, has appropriately instituted a Motor Vehicle Pollution Control Board having as its primary purpose the elimination, or conversion of these noxious components.

The primary object of the present invention is, therefore, to provide an improved method for the catalytic treatment of noxious, combustible gaseous waste products for the purpose of eliminating the noxious material and/or converting the same into innocuous components. A related object is to utilize a catalytic composite having an additive component along with an active catalytic component to enhance the physical structure and the propensity for effecting the oxidation of a hydrocarbon-containing mixture including carbon monoxide, as well as the capability to effect such conversion for a prolonged period of time.

Prior associated work has discovered the improved oxidation and/or conversion of waste gases through the use of a low density porous alumina carrier material having a catalytically active oxidizing component composited therewith. Platinum, palladium and other noble metal components are preferred, although an oxide of one or more metals from Groups V-A, VI-A and VIII may comprise a desirable active metal component for the composite.

It has now been discovered that an alkaline earth component, particularly barium, calcium and strontium, when incorporated into the catalyst composite, is critically important in improving the stability or life of the catalyst as well as decrease lead pick-up, where the catalyst is subjected to exhaust gas fumes from engines using leaded fuels.

A broad embodiment of the present invention encompasses a method for effecting the conversion of a noxious waste gas stream which comprises contacting such stream with a catalytic composite of a porous refractory carrier material, a catalytically active metallic component and an alkaline earth component selected from the group consisting of calcium, barium and strontium.

Another broad embodiment of the present invention involves a method for effecting the conversion of noxious exhaust gases which comprises contacting said gases at conversion conditions with a catalytic composite of alumina, a platinum component and an alkaline earth component which is prepared by impregnating porous alumina particle with an alkaline earth component selected from the group consisting of calcium, strontium and barium, and with a platinum component.

A more specific embodiment of the present invention provides a method for converting a noxious exhaust gas stream to less objectionable components by contacting such stream at conversion conditions with a catalytic composite of low density porous alumina particles, platinum and an alkaline earth component prepared by commingling said alumina with chloroplatinic acid to provide from about 0.01% to about 1% platinum by weight of the composite, drying the resulting mixture at a temperature within the range of from about 100° F. to about 250° F., subsequently subjecting the mixture to an atmosphere of hydrogen at a temperature within the range of from about 200° F. to about 1800° F., thereafter impregnating the resulting material with a solution of a component selected from the group consisting of barium, strontium and calcium, and then drying the resulting catalyst composite.

Another limited embodiment of the present invention involves a method for eliminating hydrocarbons from gases containing the same which comprises contacting said gases, at conversion conditions, with a catalytic composite of alumina and a platinum component, said catalytic composite being prepared by commingling said alumina with a solution of an alkaline earth component selected from the group consisting of calcium, strontium and barium, subsequently commingling a platinum-containing compound to provide from about 0.01% to about 1% platinum by weight of the composite, drying the impregnated composite and thereafter reducing it in an atmosphere of hydrogen at a temperature within the range of from about 200° F. to about 1800° F.

The alkaline earth component may be composited with the carrier material either prior to, or after, the impregnation thereof with the active platinum component and it is not intended to limit the improved catalytic composite to any one sequence of steps of preparation, although one method may provide improved results in use, as compared to another method. Alternatively, there may be a coimpregnation of the added alkaline earth component along with the active metallic component.

As hereinbefore set forth, the method of the present invention involves particularly the catalytic treatment of noxious, gaseous combustible waste products prior to discharging the same into the atmosphere. The catalytic composite for use therein, hereinafter described in detail, may be placed in any suitable container, or catalytic converter, and installed within the exhaust line in such a manner that the gaseous waste products are passed therethrough. The catalytic converter may be of the through-flow, cross-flow or radial-flow design and when utilized in the conversion of the noxious components emanating from an internal combustion engine, may either supplant, or be combined with the common acoustic muffler. Combustion air is injected ahead of the converter inlet, usually by an aspirator or suitable external compressive means, and the waste products, together with air, are passed through the catalyst in either upward or downward-flow, cross-flow or radial-flow. When employed in other applications, such as the treatment of the gaseous waste products from the printing, tanning and petrochemical industries, the catalytic composite may be conveniently disposed as a fixed bed within the stack, or other outlet ducts, of a suitable combustion chamber, the combustion products and air being passed in admixture into contact with the catalyst prior to being discharged into the atmosphere. The precise physical structure of the catalytic converter, the means for introducing combustion air, and the disposition of the catalytic composite within the converter are dependent to a large extent upon the application and the function to be served.

A wide variety of factors affect the stability of active catalytic composites, and are generally peculiar to the environment in which the catalyst is employed. For example, an automotive internal combustion engine is commonly operated over a wide range of speed and load conditions including idling, cruising, accelerating and decelerating and, therefore, the combustion efficiency of such an engine is varied considerably. The space velocity and temperature of the manifold exhaust gases, as well as the concentration of combustible material therein, will similarly vary over relatively wide limits. Therefore, when applied to the treatment of noxious exhaust gases from an automotive internal combustion engine, the catalyst must necessarily have the inherent capability of withstanding high temperatures of the order of 1600° F. to as high as about 2000° F., and should possess high activity at substantially lower temperatures. The catalyst should have a relatively low threshold activation temperature in order that the necessary conversion reactions become self-initiating within a minimum period of time following the startup of the engine at relatively cold conditions. These characteristics have been recognized as essential by the Motor Vehicle Pollution Control Board in setting forth the specifications relating to the efficiency with which the noxious components are eliminated or converted. The catalyst must, therefore, necessarily operate in a satisfactory manner at a temperature which can conceivably vary from about 200° F. to as high as about 2000° F., at any given time.

The catalytic composite of the present invention is characterized by the fact that it contains an alkaline earth component selected from the group consisting of calcium, strontium and barium and at least one catalytically active metallic component. Of the alkaline earth components, barium appears to provide the better results and is thus generally preferred. As employed in the present specification, as well as in the appended claims, the term "metallic component" is intended to connote those components of the catalyst which are employed for their catalytic activity in converting the noxious material into innocuous components, as distinguished from that portion of the catalyst herein referred to as the refractory inorganic oxide, and which is employed for the purpose of supplying a suitable carrier material, or support, for the "catalytically active metallic components." Although not considered to be a limiting feature of the present invention, it is preferred that the catalytically active metallic component, or components, be composited with a refractory inorganic oxide carrier material which has an apparent bulk density less than about 0.4 gram per cc. Preferred refractory inorganic oxides, for use as the carrier material, possess an apparent bulk density within the range of about 0.15 to about 0.35 gram per cc. The catalytically active metallic components, composited with the refractory inorganic oxide carrier material, may be one or more of the following: vanadium, chromium, molybdenum, tungsten, members of the iron-group and platinum-group of the Periodic Table, copper, silver and gold. A particular metal may be used in and of itself, or in combination with any of the foregoing metals. The catalyst of the present invention may comprise a metallic component selected from Groups V-A, VI-A and VIII of the Periodic Table. Thus, the catalyst to be employed in the treatment of noxious, gaseous combustible waste products, prior to discharging the same into the atmosphere, may comprise the following: platinum, palladium, other noble metals such as iridium, ruthenium, and rhodium, iron, cobalt, nickel, copper, vanadium, tungsten, molybdenum, silver, gold, and various mixtures including platinum-iron, platinum-cobalt, platinum-nickel, palladium-iron, palladium-cobalt, palladium-nickel, platinum-palladium, palladium-copper-cobalt, copper-cobalt-nickel-platinum, platinum-palladium-cobalt, etc. It is understood that the catalytic activity, stability, auto-initiating temperature, and other characteristics of the catalyst of the present invention, may vary from catalyst to catalyst. Many of the specific catalytic composites discussed herein do not necessarily yield equivalent results when compared with a catalyst comprising one or more different metallic components, or when utilized under varying conditions in different applications. Although the precise manner in which the catalytically active metallic component, such as platinum, is disposed within the carrier material, is not known with absolute certainty, it is believed that the platinum, or other metallic component, enters into a complex combination with the carrier material and other components of the catalyst. Therefore, it is understood that the use of the term "platinum" or "metallic component," for example, connotes platinum or other metallic components existing within the carrier material in a combined form and/or in the elemental state.

The catalytic composite of the present invention, the method of the preparation of which is hereinafter set forth in greater detail, utilizes a refractory inorganic oxide as the carrier material for the active metallic components hereinbefore set forth. Refractory inorganic oxides possess particular physical characteristics which readily permit adaptation thereof to the rather unique environment encountered in the operation of a motor vehicle, as well as in other commercial applications. One desired physical characteristic, for example, is that extremely high temperatures do not apparently affect the capability of the material to function as desired. The refractory inorganic oxide carrier material, for utilization in the catalyst of the present invention, may be manufactured by any suitable method including separate, successive, co-precipitation means of manufacture when comprising two or more individual inorganic oxides. The carrier material may comprise naturally-occurring substances such as clays, or earths, and may or may not be activated prior to use by one or more treatments including drying, calcining, steaming, or treatments with various reagents, etc. The catalytic composite of the present invention will preferably make use of an alumina-containing refractory inorganic oxide carrier material: as employed herein, the term "alumina" is intended to include porous aluminum oxide in various states of hydration. In addition to alumina, other refractory inorganic oxides may be employed, either in conjunction with, or instead of, the alumina. Other suitable inorganic oxides include silica, boria, thoria, titania, zirconia, hafnia, and mixtures of two or more. The incorporation of any of the foregoing refractory inorganic oxides, in conjunction with the alumina, is generally dependent upon the desire to add thereto certain physical and/or chemical characteristics required by the particular application for which the catalytic composite is intended. Such other refractory inorganic oxides, for example, silica, will be present within the carrier material in an amount within the range of about 0.5% to about 25.0% by weight thereof, based upon the final weight of the carrier. Intermediate quantities are preferred and will lie within the range of about 1.0% to about 10.0% by weight. The carrier material may take the form of any desired shape such as spheres, pills, extrudates, granules, cakes, briquettes, rings, etc. The preferred form is the low density sphere, and spheres may be continuously manufactured by the well-known oil-drop method: this method is described in detail in U.S. Patent No. 2,620,314 issued to James Hoekstra. In the interest of simplicity and clarity, the following discussion will be restricted to the use of alumina as the refractory inorganic oxide carrier material.

Various methods of impregnation may be used to impregnate the carrier material with the added alkaline earth components. Generally, a water soluble compound of the particular component is used to soak the carrier or the activated composite so as to insure a bond of the component, as a resulting oxide with the carrier. Thus, the barium, strontium, or calcium compound may be in the form of a hydroxide, a formate, a nitrate, etc., when used to impregnate the carrier or composite. Impregnation may be adequately accomplished in a one or two hour soaking, however, generally the soaking will be carried out for 4 to 20 hours or the like to provide optimum results. After the impregnation, the composite is subjected to drying by heating or the use of a rotary evaporator. It appears also that impregnation with the added component may be before or after impregnation with the active metallic catalytic component, although equivalent activity-stabilities, crushing strengths and lead resistances may not be obtained from the different methods of compositing. It further appears, as will be set forth in more detail hereinafter, that the added component shall be present in an amount greater than 1% by weight of the resulting composite, so as to improve such composite for effecting the oxidation and conversion of noxious waste gases.

Where desired, halogen may be combined with the alumina and the catalytically active metallic components, and may be added thereto in any suitable manner either before or after the incorporation of the active metallic components. The addition of the halogen is generally accomplished through the use of an acid such as hydrogen fluoride and/or hydrogen chloride, or volatile salt such as ammonium fluoride and/or ammonium chloride, and the halogen may be combined with the alumina during the preparation of the latter. In still another method of manufacture, the halogen may be composited with a refractory oxide during the impregnation thereof with the catalytically active metallic components. Thus, where the alumina is prepared from an alumina hydrosol having an aluminum to chloride weight ratio of about 1:3, the use of such method permits the incorporation of chloride where the latter is desired as the halogen component.

Regardless of the particular refractory inorganic oxide carried material employed, the catalytically active metallic components may be added thereto in any suitable, convenient manner. However, in accordance with the present invention, prior to or during the addition of the metallic component, such as platinum, the preformed inorganic oxide particles, such as alumina, are treated with an organic acid selected from a particular group thereof. In some instances, the organic acid may be combined with the metallic component, for example, a water-soluble platinum-containing compound, and the resulting mixture then added to the alumina particles. The selected organic acid may be added to the alumina particles as a separate solution just prior to commingling with the metallic component. For ease in handling and metering, the organic acid is preferably admixed, in the requisite quantity, with the water-soluble compound of the intended catalytically active metallic component, and the resulting impregnating solution combined with the carrier material. With respect to platinum, suitable water-soluble compounds for utilization in the impregnating solution include chloroplatinic acid, chloroplatinous acid, platinous chloride, platinic chloride, etc. Where the catalytic composite is intended to contain other metallic components, such as those hereinbefore set forth, the composite may be prepared by commingling water-soluble compounds of these components, particularly the nitrates, sulfates, chlorates, chlorides, or carbonates, and immersing the particles of the carrier material therein, followed by heating to form the corresponding oxides of the metallic components.

The quantity of the catalyticaly active metallic components is based upon the volume of the carrier material to be combined therewith, and is calculated on the basis of the elemental metal, notwithstanding that the metallic component may exist in some combined complex form, or in the elemental state. Thus, with respect to platinum group metals, the platinum will be present in an amount of from about 0.05 to about 2.0 troy ounces per cubic foot of carrier material, or within the range of from about .01% to about 1.0% of platinum, by weight of the composite. The preferred range of the concentration of the platinum component, dictated by economic considerations, is from about 0.15 to about 0.60 troy ounce per cubic foot of carrier material. The other metallic components, either in conjunction with, or instead of, the platinum component will be present in an amount of from about 0.01 to about 2.0 troy ounces per cubic foot of carrier material employed.

In describing the method of manufacturing the catalytic composite encompassed by the present invention, it is understood that the same is not considered to be unduly limited to the particular catalytic composite described. The catalyst, in one example, is prepared by initially forming alumina spheres, $\frac{1}{16}$-inch to about $\frac{3}{16}$-inch in diameter, from an aluminum chloride hydrosol having an aluminum chloride weight ratio of about 1.25. The alumina spheres are continuously prepared by passing droplets of the hydrosol into an oil bath maintained at an elevated temperature, retaining the droplets within the oil until the same set into hydrogel spheroids. The spheroids are dried at a temperature of from about 200° F. to about 800° F., and thereafter subjected to a calcining treatment at a temperature of from about 800° F. to about 1200° F. An impregnating solution of barium hydroxide is used to soak about 150 grams of the alumina spheres for an overnight period, approximately 16 to 20 hours, and then they are rinsed and dried at about 200° to 450° F. to provide approximately 6% barium, by weight of the composite. An impregnating solution of chloroplatinic acid, having the concentration of 0.0628 gram of platinum per milliliter, is prepared by diluting 3.0 milliliters to about 500 milliliters with water. When utilized with the approximately 150 grams of the alumina-barium spheres, having an apparent bulk density of about 0.29 gram per cc., this concentration of the chloroplatinic acid solution will yield a final composite having about 0.32 troy ounce of platinum per cubic foot of the spherical alumina carrier material. The mixture of chloroplatinic acid and alumina-barium spheres is evaporated to dryness in a rotating dryer at a temperature of about 210° F. When the spheres appear visually dry, usually in about 2 to about 8 hours, the impregnated spheres are subjected to a reducing treatment, preferably in an atmosphere of hydrogen, while increasing the temperature to a level within the range of about 200° F. to about 1800° F., maintaining the elevated temperature for about 2 hours. Contrary to present-day methods of manufacturing catalytic composites, the catalyst of the present invention is not subjected to an oxidation treatment at elevated temperature, or to high temperature calcination in an atmosphere of air. A high temperature oxidation treatment tends to destroy both the initial activity and more particularly the stability of the catalytic composite to effect the removal and/or conversion of the noxious components in the combustible gaseous waste products. Furthermore, oxidation in air will cause the catalytic composite to come in contact with nitrogen at an elevated temperature, and, as hereinafter indicated, such treatment tends to destroy the stability of the catalytic composite.

In an alternative embodiment, the catalyst preparation is carried out in a manner similar to that just described except that the chloroplatinic acid impregnation is carried out prior to the barium hydroxide treatment. Also, the compositing of the barium may be after drying but prior to the hydrogen reduction treatment or after the reduction. From the foregoing description, it will be noted that in all instances the inorganic oxide carrier material and additive component is combined with a catalytically active metallic component.

The following examples are given for the purpose of illustrating clearly the method of manufacturing the catalytic composite encompassed by the present invention. It is understood that the present invention is not to be unduly limited beyond the scope and spirit of the appended claims, by the conditions, reagents, concentrations or catalytic composites employed within the examples. The data presented within the examples will indicate the benefits to be afforded by the present invention, which invention utilizes a catalytic composite having an additive alkaline earth component and a catalytic amount of an active metal component. It will be readily ascertained that the catalytic composite offers particular advantages in a process for the elimination of the products of incomplete combustion from the hydrocarbonaceous exhaust gases emanating from an internal combustion engine, by which method such exhaust gases become innocuous upon being discharged into the atmosphere.

Also, the following examples describe experimental composites which were employed in obtaining data to evaluate the improved catalyst and methods of preparation, as well as use in effecting conversion of hydrocarbons and carbon monoxide in an engine exhaust gas stream. A specific catalyst evaluation test procedure was utilized that was designed to determine the catalytic stability with respect to automotive exhaust conversion. The various catalytic composites are evaluated by a test procedure which simulates actual driving conditions. The test procedure involves the utilization of a standard dynamometer, by which an eight-cylinder internal combustion engine is loaded by a motor generator. Approximately 440 cc. of each of the catalyst portions are individually evaluated by each being placed within a cylindrical vessel, or converter, having an inside diameter of about 4 inches, the entire apparatus being serially connected into the engine exhaust line. In each case, the catalyst sample is disposed within the converter on a supporting screen to a bed height of about 2 to about 3 inches. A second screen is placed above the catalyst bed for the purpose of separating the catalyst from the ¼-inch ceramic balls employed to facilitate the even distribution of the exhaust gases flowing downwardly through the apparatus. Four such catalyst-loaded converters are utilized in a given test period; this practice permits the simultaneous testing of different catalysts and provides an excellent basis for making a comparative study of the results.

Combustion air is pressured into the converter inlet, the flow rate being adjusted such that the average temperature of the catalyst bed is maintained at a level within the range of about 800° F. to about 1700° F. It is preferred that the flow rate of combustion air be held constant at about six pounds per hour, such that the catalyst bed average temperature is maintained at a level of about 950° F. The fuel employed in the test procedure is a blend of catalytically reformed gasoline (40.0%), catalytically cracked gasoline (40.0%) and alkylate (20.0%), and contains 3.0 milliliters of tetraethyl lead per gallon. Since the concentration of unburned hydrocarbons, and other noxious products, within the exhaust gases, as well as the throughput thereof, varies in accordance with the physical status of the engine, whether idling, accelerating, cruising or decelerating, the tests procedure still further approximates actual road conditions by providing for a constant load throughout only a portion of the entire test period. Samples of the converter inlet and outlet gases are taken at various intervals during the test procedure, there being a constant analysis for the concentration of carbon monoxide. The samples are analyzed for hydrocarbons by a flame-ionization detector. The term "hydrocarbon," as utilized in reporting the results of the analyses performed on the effluent gases from the catalytic converter, connotes all hydrocarbons whether saturated, unsaturated, or partially oxidized as hereinbefore set forth. The carbon monoxide concentration within the exhaust gases is determined by an accurate infra-red detector. The internal combustion engine is operated in a particular cycle to simulate idling, accelerating, cruising, and decelerating as experienced under actual road conditions. During the entire test procedure, which covers a period of about 40 hours, about 300 gallons of the aforementioned fuel is employed. The 40-hour test period is divided into eight five-hour cycles; each five-hour cycle consists of a four and one-half hour cruise at a constant 2500 r.p.m. and 41 BHP, and a one-half hour cycle consisting of a series of 15 two-minute cycles comprising idling at 750 r.p.m., accelerating to cruise at 2000 r.p.m., and a deceleration to idling at 750 r.p.m.

An inherent result of the small volume of catalyst employed in the test evaluation procedure is that the space velocity of the exhaust gases coming into contact with the catalyst is considerably higher than would usually be encountered under actual driving conditions. Accordingly, the percentage conversion obtained during actual use in automotive exhaust gas converters would be considerably higher. The data obtained from the 10 hour to 40 hour test procedure is also plotted on semi-logarithmic coordinates and results in a curve from which the following equation is derived:

$$C = Ae^{-t/k}$$

In the equation, $k$ equals the reciprocal of the slope, $A$ equals the percent initial conversion obtained by extrapolation, $C$ equals the percent conversion in time $(t)$, and $t$ equals the time in hours. The above equation is employed in computing the "K" stability factors for the individual catalytic composites. A decrease in the slope of the curve resulting from the data obtained, or conversely, an increase in "K" value, indicates a catalyst possessing a greater degree of stability when converting the hydrocarbonaceous combustion products of an internal combustion engine. In those instances where the "K" stability factor is positive, indicating a positive slope, the stability of the catalyst being evaluated may be said to increase with time.

The foregoing described test procedure is employed as a primary evaluation of the catalysts. The importance of this evaluation resides in the "K" stability factor of the catalytic composite being tested. That is, although the wide variety of catalytic composites possess a relative high initial activity, the stability of such catalysts is such that the maximum tolerable limits imposed upon the hydrocarbon and carbon monoxide concentrations are reached in a relatively short period of time. The ⅛-inch diameter alumina spheres, used as the base or carrier for all composites of the following examples, were prepared by the same procedure and had substantially the same physical characteristics and low apparent bulk density of the order of 0.28 gram per cubic centimeter.

To provide an evaluation of the physical strength of various of the catalyst composites, representative samples of each test catalyst were subjected to a standard test procedure to determine the "peripheral crushing strength" (PCS) thereof. The average crushing strength of a particle is determined as the arithmetic average of the force required to crush each particle of a given number of individual particles. Each particle is crushed in an apparatus constructed in such a manner that the force is applied continuously and at a uniform rate beginning with a zero load.

The crushing strength apparatus consists essentially of a balance beam resting on a knife edge. The knife edge is located at unit distance from an anvil on which the catalyst particle is placed. A cup, which receives the lead shot by which the load is applied, is situated on the other side of the knife edge, four times the unit distance therefrom. The lead shot falls into this cup from a hopper at a rate of about nine pounds per minute, thus loading the particle at a rate of about 36 pounds per minute. A single particle is placed on the anvil of the apparatus, and the beam balanced by means of a small spirit level. Force is applied to the particle by opening the shutter in the bottom of the hopper containing the lead shot, thus allowing the shot to flow in a continuous stream into the cup. The flow of lead shot is immediately, and automatically, cut off when the particle is completely crushed. The weight of lead shot within the cup is multiplied by a factor of four to give the actual peripheral crushing strength of the particle. The procedure is repeated 30 times and the crushing strength taken as the arithmetic average of the observed individual crushing strengths.

EXAMPLE I

In order to provide a catalyst for comparison to the use of improved catalysts containing an additive component of calcium, strontium or barium, a reference catalyst was prepared. The ⅛-inch alumina spheres were impregnated with a sufficient quantity of chloroplatinic acid (having a concentration of 0.0628 gram of platinum per milliliter) to yield a catalyst containing 0.32 troy ounce of platinum, calculated as the element thereof, per cubic foot of alumina. For 150 grams of the alumina spheres, the required quantity of chloroplatinic acid was diluted to 500 milliliters with water and then used for the impregnation step. Subsequently the spheres were evaporated to dryness in a rotating dryer at a temperature of about 210° F. Then, while increasing the temperature to a level of about 1000° F., the catalyst was subjected to an atmosphere of hydrogen; after reaching a temperature level of 1000° F., the hydrogen treatment was continued at that temperature for a period of about two hours. The catalyst was allowed to cool in the reducing zone prior to being exposed to the atmosphere.

Upon testing the catalyst in accordance with the procedure outlined, it was found that this reference catalyst provided an initial hydrocarbon conversion of 79.8% and at the end of 40 hours a conversion of 52.1%, while stability factor was equal to 93.1. The carbon monoxide conversion was initially 94.7% and after 40 hours 73.8% with a stability factor of 160.0. After the 40 hour period, the lead retention was 10.6% and the peripheral crushing strength 2.0 pounds.

EXAMPLE II

Alumina spheres were impregnated with chloroplatinic acid as described in Example I to yield 0.32 troy ounce of platinum, calculated as the element thereof, per cubic foot of alumina. The resulting catalytically activated composite was then dried and reduced in the presence of hydrogen for an approximate two hour period at about 1000° F. The platinum-alumina spheres were then treated with a barium hydroxide solution containing 10% barium oxide by weight of the composite for an overnight period and then washed, dried and calcined at 1000° F. to provide a resultant alumina-barium oxide base having approximately 6.4% barium, by weight of the composite.

Upon testing, the catalyst was found to provide an initial hydrocarbon conversion of 76.0% and at the end of 40 hours a conversion of 61.5% thus providing a stability factor "K" of 190.0. The CO conversion was initially 82.6% and after 40 hours 73.3% with a stability factor of 331.7. Also after the 40 hour period the lead retention was 8.48% and the peripheral crushing strength 3.5 pounds. It may thus be noted that the reduced lead retention, improved crushing strength and better carbon monoxide conversion stability shows significantly better results than those of the reference catalyst.

EXAMPLE III

The alumina spheres were first treated with chloroplatinic acid as in the foregoing examples to provide a resulting composite containing 0.32 troy ounce of platinum per cubic foot of alumina. The composite was then dried and reduced in the presence of hydrogen for an approximate two hour period at a temperature of about 1000° F. The platinum-alumina composite was subsequently treated with a solution of calcium hydroxide, containing 10% calcium oxide by weight thereof, for an overnight period and then rinsed and dried to provide a resulting composite containing 3.7% calcium by weight of the dried composite.

In the testing operation, the catalyst was found to provide an initial hydrocarbon conversion of 70.2% and at the end of 40 hours a conversion of 61.3%, with a resulting stability factor of 296.6. The CO conversion was initially 80.1% and after 40 hours equivalent to 78.3% with a stability factor of 1771.4. The lead retention after the 40 hour period was 9.34% and the peripheral crushing strength was 3.4 pounds. The calcium impregnated catalyst of this example thus provided good stability, good crushing strength, and a substantially reduced lead retention as compared to the reference catalyst.

EXAMPLE IV

The alumina spheres of this example were also treated with a chloroplatinic acid solution to provide a resulting dried and reduced composite with approximately 0.32 troy ounce of platinum per cubic foot of alumina. Subseqently the platinum-alumina spheres were treated with a strontium hydroxide solution, containing 10% strontium oxide by weight of the composite for an overnight period and then rinsed and dried providing a resulting composite containing 3.2% of strontium, by weight thereof.

The catalyst testing procedure was found to provide an initial hydrocarbon conversion of 64.3% and after 40 hours a conversion of 68.6% with a stability factor equivalent to +612.3. The CO conversion was initially 73.4% and after 40 hours 79.5%, with the stability factor +411.1. Lead retention after the 40 hour test period was 8.75% and peripheral crushing strength of 3.4 pounds. It may be noted that the strontium containing composite also provided good activity and stability together with a low lead retention and high crushing strength as compared with the reference catalyst.

EXAMPLE V

The alumina spheres of this example were also treated with a chloroplatinic acid solution to provide a resulting dried and reduced composite with approximately 0.32 troy ounce of platinum per cubic foot of alumina. Subsequently the platinum-alumina spheres were treated with a barium hydroxide solution containing 2% barium oxide by weight of the composite for an overnight period and then rinsed and dried.

The catalyst testing procedure was found to provide an initial hydrocarbon conversion of 77.6% and after 40 hours a conversion of 63.3% with a stability factor equivalent to 196.8. The CO conversion was initially 93.6% and after 40 hours 78.7%, with the stability factor 230.2. Lead retention after the 40 hour test period was 8.79% and peripheral crushing strength of 2.5 pounds.

EXAMPLE VI

The alumina spheres of this example were also treated with a chloroplatinic acid solution to provide a resulting dried and reduced composite with approximately 0.32 troy ounce of platinum per cubic foot of alumina. Subsequently the platinum-alumina spheres were treated with a barium hydroxide solution, containing 30% barium oxide by weight of the composite for an overnight period and then rinsed and dried providing a resulting composite containing 10.5% of barium, by weight thereof.

The catalyst testing procedure was found to provide an initial hydrocarbon conversion of 64.4% and after 40 hours a conversion of 67.6% with a stability factor equivalent to +799.7. The CO conversion was initially 75.2% and after 40 hours 79.3%, with the stability factor +752.8. Lead retention after the 40 hour test period was 6.16 and peripheral crushing strength of 3.6 pounds.

EXAMPLE VII

The alumina spheres of this example were also treated with a chloroplatinic acid solution to provide a resulting dried and reduced composite with approximately 0.32 troy ounce of platinum per cubic foot of alumina. Subsequently the platinum-alumina spheres were treated with 5% magnesium oxide as a formate solution which was prepared by dissolving magnesium hydroxide in formic acid. The spheres were impregnated with the formate solution and then dried and calcined at 1000° F.

The catalyst testing procedure was found to provide an initial hydrocarbon conversion of 64.9% and after 40 hours a conversion of 57.6% with a stability factor equivalent to 337.0. The CO conversion was initially 80.1% and after 40-hours 74.8%, with a stability factor of 1054.7. Lead retention after the 40 hour test period was 10.0% and peripheral crushing strength 2.5 pounds.

EXAMPLE VIII

The alumina spheres of this example were also treated with a chloroplatinic acid solution to provide a resulting dried and reduced composite with approximately 0.32 troy ounce of platinum per cubic foot of alumina. Subsequently the platinum-alumina spheres were treated with lithium hydroxide, containing approximately 5% lithium oxide by weight thereof, and then dried and calcined at 1000° F.

The catalyst testing procedure was found to provide an initial hydrocarbon conversion of 74.1% and after 40 hours a conversion of 36.5% with a stability factor equivalent to 57.1. The CO conversion was initially 86.9% and after 40 hours 57.5%, with the stability factor 97.2. Lead retention after the 40 hour test period was 10.4% and peripheral crushing strength 3.0 pounds.

EXAMPLE IX

The alumina spheres of this example were also treated with a chloroplatinic acid solution to provide a resulting dried and reduced composite with approximately 0.32 troy ounce of platinum per cubic foot of alumina. Subsequently the platinum-alumina spheres were treated with 5% beryllium oxide, as a formate solution prepared by dissolving beryllium hydroxide in formic acid. The spheres were impregnated with the formate solution and then dried and calcined at 1000° F.

The catalyst testing procedure was found to provide an initial hydrocarbon conversion of 84.9% and after 40 hours a conversion of 21.2% with a stability factor equivalent to 22.8. The CO conversion with initially 96.3% and after 40 hours 48.6% with the stability factor 58.4. Lead retention after the 40 hour test period was 10.7% and peripheral crushing strength 4.3 pounds.

For convenience in comparing the resulting data from the various test procedures, the results of the foregoing Examples I through IX are recapitulated in the accompanying Table I.

Also, to show visually a difference between various of the composites, reference is made to the accompanying drawing which plots, in a graphical manner, the initial hydrocarbon conversion results against the 40 hour hydrocarbon conversion results. Thus, such catalysts that provide results high on the graph and close to the line "A" (which is a line of equivalent percentages) are preferred composite. For comparison purposes the conversion results of the standard platinum-alumina reference catalyst are also plotted on the graph, as obtained from Example I. It will be noted that the selected alkaline earth components have a particularly valuable effect on the catalyst composite for oxidation efficiency and stability, as well as strength. The magnesium oxide was less effective, while beryllium and lithium oxides gave quite poor results.

TABLE I

| Example No. | Type of Catalyst | Hydrocarbon Conversion | | | CO Conversion | | | Percent Lead Retention | Pounds Crushing Strength |
|---|---|---|---|---|---|---|---|---|---|
| | | A | 40 Hr. | K | A | 40 Hr. | K | | |
| I | Al₂O₃+.32 Tr.oz.Pt./cu.ft.+Red. in H₂+ | 79.8 | 52.1 | 93.1 | 94.7 | 73.8 | 160.0 | 10.6 | 2.0 |
| II | Al₂O₃+.32 Tr.oz.Pt./cu.ft.+Red. in H₂+Ba(OH)₂ (6.4% Ba) | 76.0 | 61.5 | 190.0 | 82.6 | 73.3 | 331.7 | 8.48 | 3.5 |
| III | Al₂O₃+.32 Tr.oz.Pt./cu.ft.+Red. in H₂+CaO | 70.2 | 61.3 | 296.6 | 80.1 | 78.3 | 1,771.4 | 9.34 | 3.4 |
| IV | Al₂O₃+.32 Tr.oz.Pt./cu.ft.+Red. in H₂+SrO | 64.3 | 68.6 | +612.3 | 73.4 | 79.5 | +411.1 | 8.75 | 3.4 |
| V | Al₂O₃+.32 Tr.oz.Pt./cu.ft.+Red. in H₂+BaO | 77.6 | 63.3 | 196.8 | 93.6 | 78.7 | 230.2 | 8.79 | 2.5 |
| VI | Al₂O₃+.32 Tr.oz.Pt./cu.ft.+Red. in H₂+BaO (10.5% Ba) | 64.4 | 67.6 | +799.7 | 75.2 | 79.3 | +752.8 | 6.16 | 3.6 |
| VII | Al₂O₃+.32 Tr.oz.Pt./cu.ft.+Red. in H₂+MgO as formate | 64.9 | 57.6 | 337.0 | 80.1 | 74.8 | 1,054.7 | 10.0 | 2.5 |
| VIII | Al₂O₃+.32 Tr.oz.Pt./cu.ft.+Red. in H₂+LiO | 74.1 | 36.5 | 57.1 | 86.9 | 57.5 | 97.2 | 10.4 | 3.0 |
| IX | Al₂O₃+.32 Tr.oz.Pt./cu.ft.+Red. in H₂+BeO as formate | 84.9 | 21.2 | 28.8 | 96.3 | 48.6 | 58.4 | 10.7 | 4.3 |

I claim as my invention:

1. A method for effecting the oxidation of noxious exhaust gases which comprises contacting said gases at oxidation conditions with a catalytic composite consisting essentially of alumina, a platinum group metal component in an amount of from about 0.01% to about 1% by weight thereof, and in excess of 1% by weight of an alkaline earth component selected from the group consisting of calcium, strontium and barium.

2. The method of claim 1 further characterized in that said metal component comprises platinum.

3. A method for effecting the oxidation of noxious exhaust gases which comprises contacting said gases at oxidation conditions with a catalytic composite consisting essentially of alumina, platinum in an amount from about .01% to about 1% by weight thereof, and barium in an amount greater than 1% by weight thereof.

4. A method for effecting the oxidation of noxious exhaust gases which comprises contacting said gases at oxidation conditions with a catalytic composite consisting essentially of alumina, a platinum component and in excess of 1% by weight of an alkaline earth component, said composite having been prepared by impregnating said alumina with a solution of a platinum containing compound and with a solution of an alkaline earth component selected from the group consisting of calcium, strontium and barium.

5. A method for effecting the oxidation of noxious exhaust gases which comprises contacting said gases at oxidation conditions with a catalytic composite consisting essentially of a treated porous alumina and a platinum component, said catalytic composite having been prepared by impregnating said alumina with a solution of an alkaline earth component selected from the group consisting of calcium, strontium and barium in an amount to incorporate more than 1% by weight of the alkaline earth component into the composite, and subsequently impregnating the previously impregnated alumina with a platinum-containing compound to provide from about .01% to about 1% platinum by weight of the composite.

6. A method for effecting the oxidation of noxious exhaust gases which comprises contacting said gases at oxidation conditions with a catalytic composite consisting essentially of alumina, a platinum component and an alkaline earth component, said composite having been prepared by commingling said alumina with a solution of platinum containing compound to provide from about .01% to about 1% platinum, based upon the weight of said alumina, drying the resulting composition in the range of from about 100° to 250° F., subsequently reducing the composite in an atmosphere of hydrogen at a temperature within the range of from about 900° F. to about 1800° F., thereafter impregnating the resulting composite with a solution of a component selected from the group consisting of calcium, strontium and barium to provide from above about 1% to about 20% of such component by weight of the alumina and then drying the resulting catalyst composite.

7. A method for effecting the oxidation of noxious exhaust gases which comprises contacting said gases at oxidation conditions with a catalytic composite consisting essentially of alumina, an alkaline earth component and a platinum component, said catalytic composite having been prepared by impregnating said alumina with a solution of an alkaline earth component selected from the group consisting of calcium, strontium and barium in an amount to incorporate more than 1% by weight of the alkaline earth component into the composite, drying the composite and then impregnating it with a platinum-containing compound to provide from about .01% to about 1% platinum by weight, drying the resulting composite in the range of from about 100° to 250° F., and subsequently reducing the composite in an atmosphere of hydrogen at a temperature within the range of from about 900° F. to about 1800° F.

References Cited

UNITED STATES PATENTS

| | | | |
|---|---|---|---|
| 3,224,831 | 12/1965 | Stephens | 23—2 |
| 3,291,564 | 12/1966 | Kearby | 23—2 |
| 3,105,739 | 10/1963 | Hayes | 23—143 |
| 3,133,029 | 5/1964 | Hoekstra | 23—2 X |
| 3,179,488 | 4/1965 | Appell | 252—475 X |

OSCAR R. VERTIZ, *Primary Examiner.*

EARL C. THOMAS, *Assistant Examiner.*